(12) United States Patent
Loeb et al.

(10) Patent No.: US 8,240,191 B2
(45) Date of Patent: Aug. 14, 2012

(54) UNIVERSAL POWER AND TESTING PLATFORM

(75) Inventors: James Bradley Loeb, Cypress, TX (US); Kurt S. Myers, Houston, TX (US)

(73) Assignee: Trident Subsea Technologies, LLC, Houston, TX (US)

( * ) Notice: Subject to any disclaimer, the term of this patent is extended or adjusted under 35 U.S.C. 154(b) by 0 days.

(21) Appl. No.: 12/634,164

(22) Filed: Dec. 9, 2009

(65) Prior Publication Data

US 2010/0085064 A1    Apr. 8, 2010

Related U.S. Application Data

(63) Continuation-in-part of application No. 12/119,782, filed on May 13, 2008, and a continuation-in-part of application No. 12/119,763, filed on May 13, 2008.

(60) Provisional application No. 61/120,867, filed on Dec. 9, 2008.

(51) Int. Cl.
   *G01M 3/04* (2006.01)
   *B63B 35/00* (2006.01)
(52) U.S. Cl. ..................... 73/49.5; 405/154.1
(58) Field of Classification Search ............ 73/49.1, 73/49.5; 166/336, 357; 405/154.1
   See application file for complete search history.

(56) References Cited

U.S. PATENT DOCUMENTS

| | | |
|---|---|---|
| 3,466,001 A | 9/1969 | Nelson |
| 3,520,358 A | 7/1970 | Brooks et al. |
| 3,640,299 A | 2/1972 | Nelson |
| 3,691,493 A | 9/1972 | Boysen et al. |
| 3,708,990 A | 1/1973 | Crooke |
| 3,777,499 A | 12/1973 | Matthews, Jr. |
| 3,788,084 A | 1/1974 | Matthews, Jr. |
| 3,961,493 A | 6/1976 | Nolan, Jr. et al. |
| 4,155,669 A | 5/1979 | Rochelle |
| 4,165,571 A | 8/1979 | Chang et al. |
| 4,229,121 A | 10/1980 | Brown |
| 4,234,268 A | 11/1980 | Scodino |
| 4,332,277 A | 6/1982 | Adkins et al. |
| 4,344,319 A | 8/1982 | Hancock et al. |

(Continued)

FOREIGN PATENT DOCUMENTS

GB    2195739    4/1998

(Continued)

OTHER PUBLICATIONS

Graves Syd, "Vessel-Free Flooding of Deepwater Pipelines Using the Copipe SPU"; The Deepwater Pipeline Technology Conference, New Orleans, LA; Mar. 9-11, 1988 (15 pp).

(Continued)

*Primary Examiner* — John Fitzgerald
(74) *Attorney, Agent, or Firm* — Conley Rose, P.C.

(57) ABSTRACT

The present invention is directed to a Universal Power Platform (UPP) that powers the pump or pumps that may not be on the platform but that are in a skid subsea near the pipeline for a desired pre-commissioning method to be carried out, such as cleaning, filling, chemical treating, pigging, hydrostatic testing or dewatering the pipeline. The UPP is suspended from a vessel by an umbilical that provides the electric power for running the selected pump(s). The Power Platform also is used as a testing system for control umbilicals that usually are near the pipelines.

18 Claims, 6 Drawing Sheets

U.S. PATENT DOCUMENTS

| | | | |
|---|---|---|---|
| 4,445,804 | A | 5/1984 | Abdallah et al. |
| 4,463,597 | A | 8/1984 | Pierce et al. |
| 4,615,571 | A | 10/1986 | Swank |
| 4,906,136 | A | 3/1990 | Norbom et al. |
| 5,044,827 | A | 9/1991 | Gray et al. |
| 5,192,167 | A | 3/1993 | da Silva et al. |
| 5,267,616 | A | 12/1993 | Silva et al. |
| 5,273,376 | A | 12/1993 | Ritter, Jr. |
| 5,348,451 | A | 9/1994 | Mohn |
| 5,421,674 | A | 6/1995 | Maloberti et al. |
| 5,842,816 | A | 12/1998 | Cunningham |
| 5,883,303 | A | 3/1999 | Bliss et al. |
| 5,927,901 | A | 7/1999 | Graves |
| 5,975,803 | A | 11/1999 | Mackinnon |
| 6,022,421 | A | 2/2000 | Bath et al. |
| 6,109,829 | A | 8/2000 | Cruickshank |
| 6,145,223 | A | 11/2000 | Flesen |
| 6,170,493 | B1 | 1/2001 | Sivacoe |
| 6,171,025 | B1 * | 1/2001 | Langner et al. ............ 405/154.1 |
| 6,200,068 | B1 | 3/2001 | Bath et al. |
| 6,234,717 | B1 | 5/2001 | Corbetta |
| 6,257,162 | B1 * | 7/2001 | Watt et al. ...................... 114/244 |
| 6,290,431 | B1 | 9/2001 | Exley et al. |
| 6,336,238 | B1 | 1/2002 | Tarlton |
| 6,435,279 | B1 | 8/2002 | Howe et al. |
| 6,454,492 | B1 | 9/2002 | Dean et al. |
| 6,503,021 | B2 | 1/2003 | Corbetta |
| 6,539,778 | B2 | 4/2003 | Tucker et al. |
| 6,549,857 | B2 | 4/2003 | Fierro et al. |
| 6,596,089 | B2 | 7/2003 | Smith et al. |
| 6,763,889 | B2 | 7/2004 | Rytlewski et al. |
| 6,840,088 | B2 | 1/2005 | Tucker et al. |
| 7,011,152 | B2 | 3/2006 | Soelvik |
| 7,093,661 | B2 | 8/2006 | Olsen |
| 7,281,880 | B2 * | 10/2007 | Tucker et al. .............. 405/154.1 |
| 7,708,839 | B2 | 5/2010 | Yemington |
| 7,765,725 | B2 * | 8/2010 | Jacobsen et al. ................. 37/317 |
| 2002/0040782 | A1 | 4/2002 | Rytlewski et al. |
| 2002/0040872 | A1 | 4/2002 | Bogoev et al. |
| 2002/0059687 | A1 | 5/2002 | Smith et al. |
| 2002/0059887 | A1 | 5/2002 | Marshall et al. |
| 2002/0129641 | A1 * | 9/2002 | Tucker et al. ................... 73/49.5 |
| 2003/0010094 | A1 * | 1/2003 | Tucker et al. ................... 73/49.5 |
| 2003/0075335 | A1 * | 4/2003 | Amin et al. .................... 166/350 |
| 2003/0145991 | A1 | 8/2003 | Olsen |
| 2003/0154769 | A1 | 8/2003 | Tucker et al. |
| 2003/0170077 | A1 | 9/2003 | Herd et al. |
| 2007/0003371 | A1 | 1/2007 | Yemington |
| 2008/0282776 | A1 | 11/2008 | Loeb et al. |
| 2008/0282777 | A1 | 11/2008 | Loeb et al. |
| 2009/0288836 | A1 * | 11/2009 | Goodall et al. ................ 166/336 |
| 2010/0089126 | A1 | 4/2010 | Sweeney |

FOREIGN PATENT DOCUMENTS

| | | |
|---|---|---|
| GB | 2421530 | 6/2006 |
| JP | 226185 | 8/1994 |
| WO | 02084160 | 10/2002 |
| WO | 02088658 | 11/2002 |

OTHER PUBLICATIONS

International Search Report and Written Opinion, Aug. 28, 2008, Application No. PCT/US2008/063599 (8 pp).

Graves, Les; Deepwater Pipeline Flooding and Pigging Without Connection to a Surface Vessel Transactions-Institute of Marine Engineers, Series C, 1999, vol. 111, No. 1 (10 pp).

Graves, Les; Controlled Deepwater Pipeline Flooding & Pigging Without Connection to a Surface Vessel, Pipeline & Gas Journal, Aug. 2001 (2 pp).

Engelmann, Georg, Dupre, Mike; Development and Utilization of an all Subsea, ROV Based, Flowline Pre-Commissioning System, Offshore Technology Conference OTC 15146; May 2003 (5 pp).

Furlow, William; Smaller, Shallow Tieback Market Grows, Offshore Magazine, Subsea/Surface Systems, Dec. 2003 [online] Retrieved from the Internet on Jun. 22, 2009; <URL: http://www.offshore-mag.c (5 pp).

Ghiselin, Dick; Wunderbar!, E&P Magazine, Feb. 1, 2004 [online] Retrieved from the Internet on Jun. 22, 2009; <URL: http://www.epmag.com/ar (2 pp).

Weatherford; Frontier 3000 Subsea Flooding Unit, Pipeline Pre-Commissioning to New Depths, Subsea Tieback Forum, Mar. 1-3, 2005 (Galveston, Texas) (2 pp).

Weatherford; Pipeline Service Solutions to Independence Hub Integrated Project Team, Jun. 2005 (See p. 5) (14 pp).

Weatherford; Pipeline & Specialty Services, presented at SGA Offshore Conference, Aug. 2005 (44 pp).

U.S. Appl. No. 61/120,867, filed Dec. 9, 2008 (14 pp).

U.S. Appl. No. 60/930,611, filed May 17, 2007 (16 pp).

U.S. Office Action dated Mar. 31, 2011, U.S. Appl. No. 12/119,763.

U.S. Office Action dated Apr. 4, 2011, U.S. Appl. No. 12/119,782.

Rigzone—Planning and Problem Solving in the Offshore Environment, May 21, 2003 (http://www.rigzone.com/news/article.asp?a_id=6731) (8 pp).

* cited by examiner

UNIVERSAL POWER AND TESTING PLATFORM

CROSS-REFERENCE TO RELATED APPLICATIONS

This application is a continuation-in-part of both U.S. application Ser. No. 12/119,782 filed May 13, 2008, entitled "Geometric Universal Pumping Platform", and U.S. application Ser. No. 12/119,763, filed May 13, 2008, entitled "Universal Pumping Platform", and further claims the benefit of U.S. provisional application Ser. No. 61/120,867 filed Dec. 9, 2008, entitled "Universal Power Platform", all of the above being incorporated herein by reference.

STATEMENT REGARDING FEDERALLY SPONSORED RESEARCH OR DEVELOPMENT

Not Applicable.

FIELD OF THE INVENTION

The present invention is directed to a power system consisting of a non-buoyant metal structure for powering motor(s) or pump(s) selected for cleaning, filling, chemical treating, pigging, hydrostatic testing or dewatering the pipeline that are in a skid subsea near the pipeline. The system is suspended from a vessel by an umbilical that provides the power to the pump(s). The system also serves as a testing system for control umbilicals that usually are located near the pipelines.

BACKGROUND OF THE INVENTION

U.S. Pat. Nos. 6,539,778; 6,840,088; and 7,281,880 are directed to pumping skids that are connected to a subsea vehicle (SV/ROV) to carry out pipeline commissioning methods. By their design, the pumping skids are attached to the underside of the SV/ROV and require the SV/ROV to power the pumps on the skid. When commissioning a pipeline, the skid and SV/ROV act as a single unit.

U.S. Ser. Nos. 12/119,782 and 12/119,763 describes a system that has a high voltage power supply located on a vessel connected by an umbilical to a non-buoyant metal structure, that can be lowered to a subsea pipeline. This universal power platform (UPP) is used to power one or more pumps on the platform depending on the specific commissioning operation on the subsea pipeline. The described UPP is independent, structurally or for a source of power, of any SV or ROV used in the pre-commissioning operations.

SUMMARY OF THE INVENTION

The present invention is directed to a Universal Power Platform (UPP) that powers the pump or pumps that may not be on the platform but that are in a skid subsea near the pipeline for a desired pre-commissioning method to be carried out, such as cleaning, filling, chemical treating, pigging, hydrostatic testing or dewatering the pipeline. The UPP is suspended from a vessel by an umbilical that provides the electric power for running the selected pump(s). The Power Platform also is used as a testing system for control umbilicals that usually are near the pipelines.

DETAILED DESCRIPTION OF THE PREFERRED EMBODIMENTS

Subsea pipelines are utilized to transport the discovered product from wells drilled subsea to a variety of disposition points. These points include existing or new offshore platforms, new pipelines or old pipelines, all of which are transporting the hydrocarbon products to onshore facilities. The pipelines terminate subsea in manifolds, used herein as a generic term, to include for example, wellhead trees, pipeline end manifolds (PLEMs), and pipeline end terminations (PLETs), to name a few. As new wells are completed, subsea pipelines form a matrix of flow for the oil/gas products that are tied through these manifolds to bring the product to shore. As dictated by law, the new sections of pipeline require hydrostatic testing to make certain that the line has no leaks. In addition to hydrostatic testing, other steps in the pre-commissioning of the pipeline may be required, including flooding, pigging, cleaning, and installing chemicals that prepare the pipeline for hydrostatic testing or dewatering and drying that may follow the successful hydrostatic testing.

Once a well is completed, a pipeline is connected to the production well pipelines for transporting the product to shore. The pipeline commissioned by the present invention often does not extend all the way to shore but is at the outer part of the matrix, a section or segment measured in hundreds or thousand of feet. Also common to a manifold as used herein is that there is structure to provide internal access to the pipeline, with a structure known as a hot stab. The subsea performance or operation of the pre-commissioning methods of the present invention will be described as pre-commissioning a pipeline between two manifolds or PLEMs, or between two stab points in the pipeline.

The present invention relates to the pre-commissioning of these subsea pipelines carried out on the pipelines on the seabed by using pump(s) in a skid near the pipeline.

Figure 1:
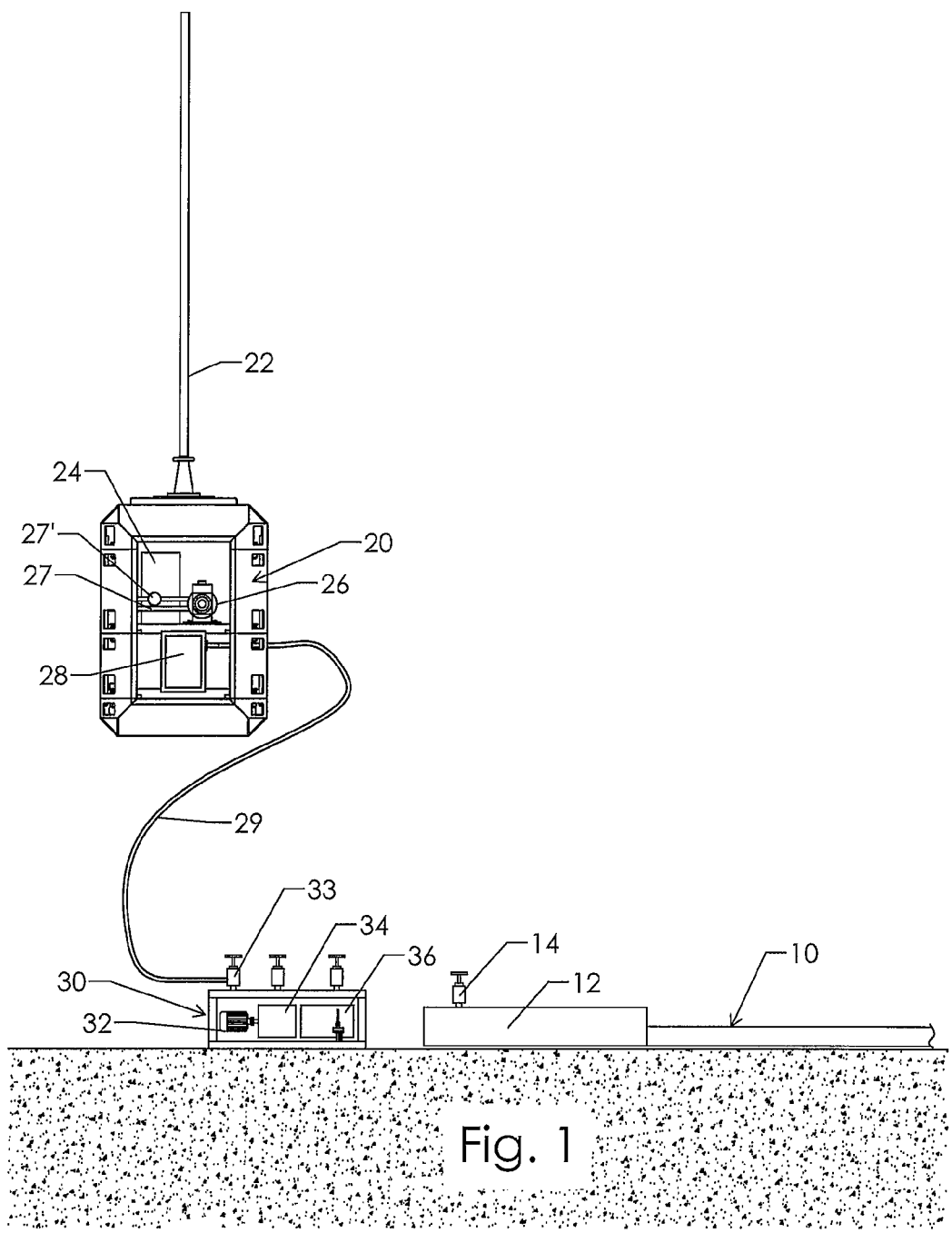
FIG. 1 is a schematic view of a pipeline that is to be commissioned that has a skid located subsea near the pipeline and a Universal Power Platform of the present invention having an electric line having at least one stab to access the skid to provide the power to the motor(s) or pump(s) in the skid to carry out a pre-commissioning method on the deep water pipeline.

Referring to FIG. 1, a deep water pipeline 10 lies on or near the sea floor between a PLEM 12 and a second PLEM, wellhead trees, or pipeline end terminations (PLETs), to name a few. The pipeline 10 may be a new line or an old line that requires a pre-commissioning method of the present invention. If newly laid, the pipe may have the PLEM 12 connected to the pipe as it comes off the pipe laying vessel and this structure is lowered to the subsea floor.

A Universal Power Platform (UPP) 20 comprises a non-buoyant structure consisting of a metal, preferably aluminum, frame that supports the necessary motors and pumps to power the pump or pumps that may not be on the platform but that are in a skid subsea near the pipeline for a desired pre-commissioning method to be carried out, such as cleaning, filling, chemical treating, pigging, hydrostatic testing or dewatering the pipeline; such as, an electric motor that drives a hydraulic pump for producing high pressure hydraulic fluid to power one or more pumps in the skid for the desired pre-commissioning method of the pipeline. The UPP is suspended from a vessel by an umbilical 22 that provides the electric current for an electric motor supported by the UPP. An umbilical is a composite cable. The function of the cable is multipurpose in that it provides (1) electric current from the vessel to the platform, for the hydraulic pump(s) and possibly lights, instrumentation, or other functions; (2) data transmission; (3) strength for supporting the platform at the tethered position or depth.

The platform (UPP) is highly flexible in that one or more electric lines may be in the umbilical composite cable. Thus, one or more electric motors 24 may be used to power the pumps. A hydraulic pump 26 on the platform will provide high pressure hydraulic fluid to power a single pump or a plurality of pumps for pumping water suitable to meet the design requirements of the specific pre-commissioning method at the depth pressures and pipe sizes of a specific subsea pipeline. The requirements for hydrostatic testing, for example, is a single pump, or a plurality of pumps, for pumping seawater at high pressure into a pipeline to increase the internal pressure to hydrostatic testing requirements (see API RP 1110; API RP 1111; ASME B31.4-2002; ASME B 31.8-2003; approximately 1.25×m. a. o. p. of the pipeline).

In addition, the platform may have a data transmitting or collecting interface. Examples are data lines connected to pipeline water pressure and/or temperature devices; and electronic devices for measuring whether connections of lines for water flow or data are connected securely, and feedback on the status of platform equipment. Flow rates or volume of water pumped may also be measured and the data transmitted through the umbilical to the vessel. Pigs passed through the pipeline during a pigging pre-commissioning method may be detected or measured, either the launching of a pig into the pipeline from a pig launcher or the recovery of a pig from the pipeline into a pig receiver. Smart pigs or other electronics may provide information of a pig as it flows through the pipeline, and acoustic data may be transmitted by the pig, received by the platform, and relayed to the surface via the umbilical to the platform.

Advantages of the UPP are:
1. No concern for the weight of the platform (UPP) as opposed to a skid attached to an ROV.
2. No buoyancy foam. Cost savings of $40,000 to $50,000.
3. Unlimited depth range as opposed to the limitations of buoyancy of an ROV.
4. Smaller in physical size with no flotation required. Deck space is always at a premium on the vessels.
5. Does not have to be uncoupled from the ROV to be worked on. All aspects of platform are immediately accessible.
6. Because it is not utilizing the ROV as a power source, the platform can be easily used on ships with older ROV equipment of lesser horsepower, as opposed to newer ROVs of greater horse power.
7. Standing alone the platform can be configured into many sizes and shapes and weights whereas all ROVs have limits to how much weight can be attached to them.

In this embodiment of the present invention an electric line 29, or a flying lead, comes from the junction box 28 as set forth in FIG. 1 of the drawings.

Further referring to FIG. 1, the UPP 20 is over a skid 30 which is placed near a subsea pipeline 10 having a manifold 12, such as a PLET, with one or more connections 14 to access the pipeline 10. The skid 30 has the appropriate equipment to perform a pre-commissioning method selected from filling, chemical treating, pigging, hydrostatic testing and dewatering on said pipeline; illustrated by an electric motor 32, a hydraulic system 34 and pump(s) 36. It is understood that the skid 30 is designed to have only the equipment necessary for the selected pre-commissioning method; if the chosen pump(s) are electrically driven, the electric line 29 is attached to the skid 30 motor 32 through a stab 33 on the skid. It is understood that the same system is needed if the pump or pumps 36 are hydraulically driven and the hydraulic system 34 is driven by the electric motor 32.

Figure 2:
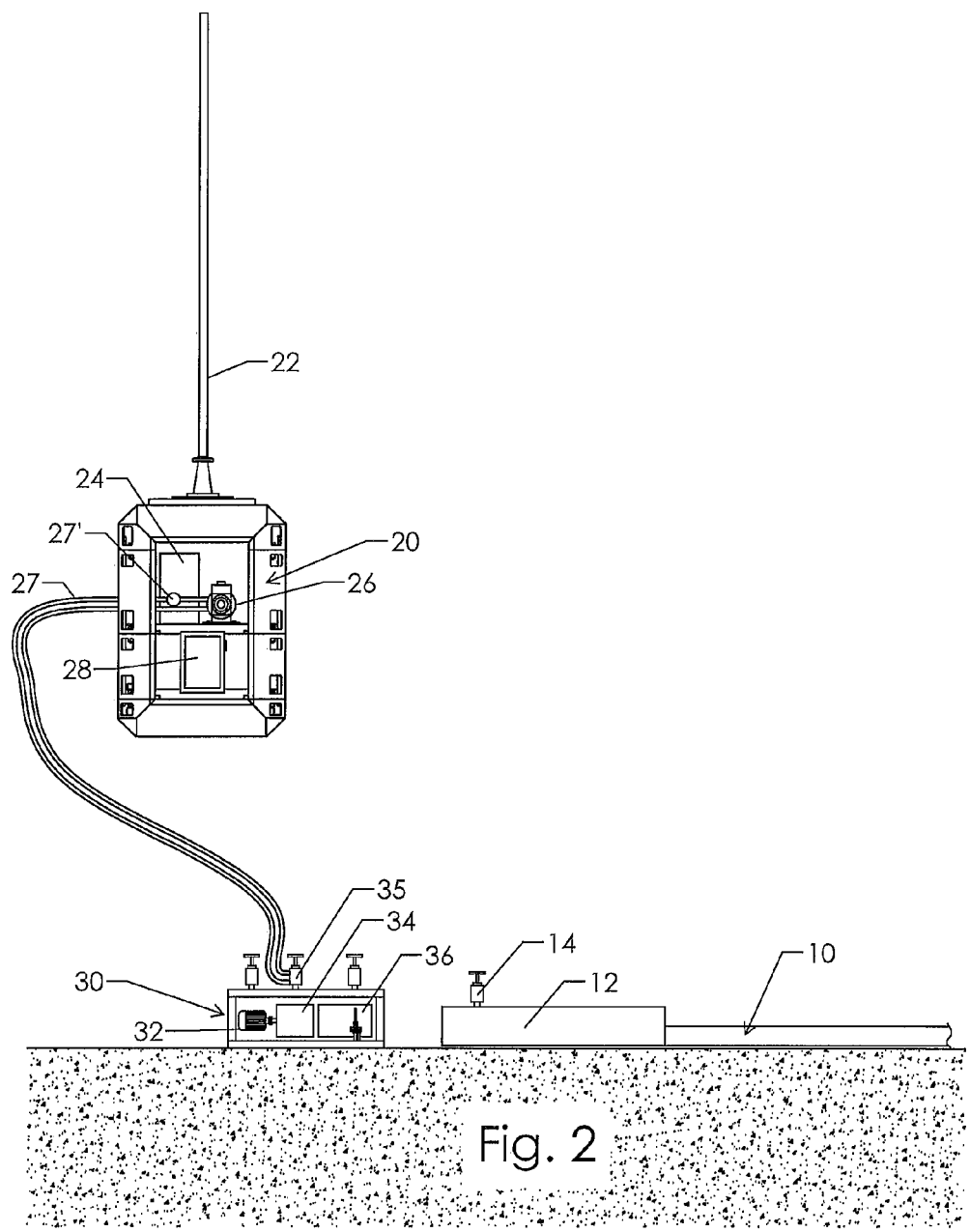
FIG. 2 is a schematic view of a pipeline that is to be commissioned that has a skid located subsea near the pipeline and a Universal Power Platform of the present invention having a hydraulic pump on the UPP with a line having a stab to access the skid to provide the power to the motor(s) or pump(s) in the skid to carry out a pre-commissioning method on the deep water pipeline.

Referring now to FIG. 2, a UPP 20 is lowered by an umbilical 22 above the skid 30 and in the vicinity of a PLET 12 having a stab 14. In this embodiment, the hydraulic system 34 is powered by a line 27 through a stab 35. Line 27 is represented as a circulation line; hence the double line, where high pressure hydraulic fluid is pumped to the hydraulic system 34 is one line and returned in the other. A replaceable filter 27' is in one line.

Figure 3:
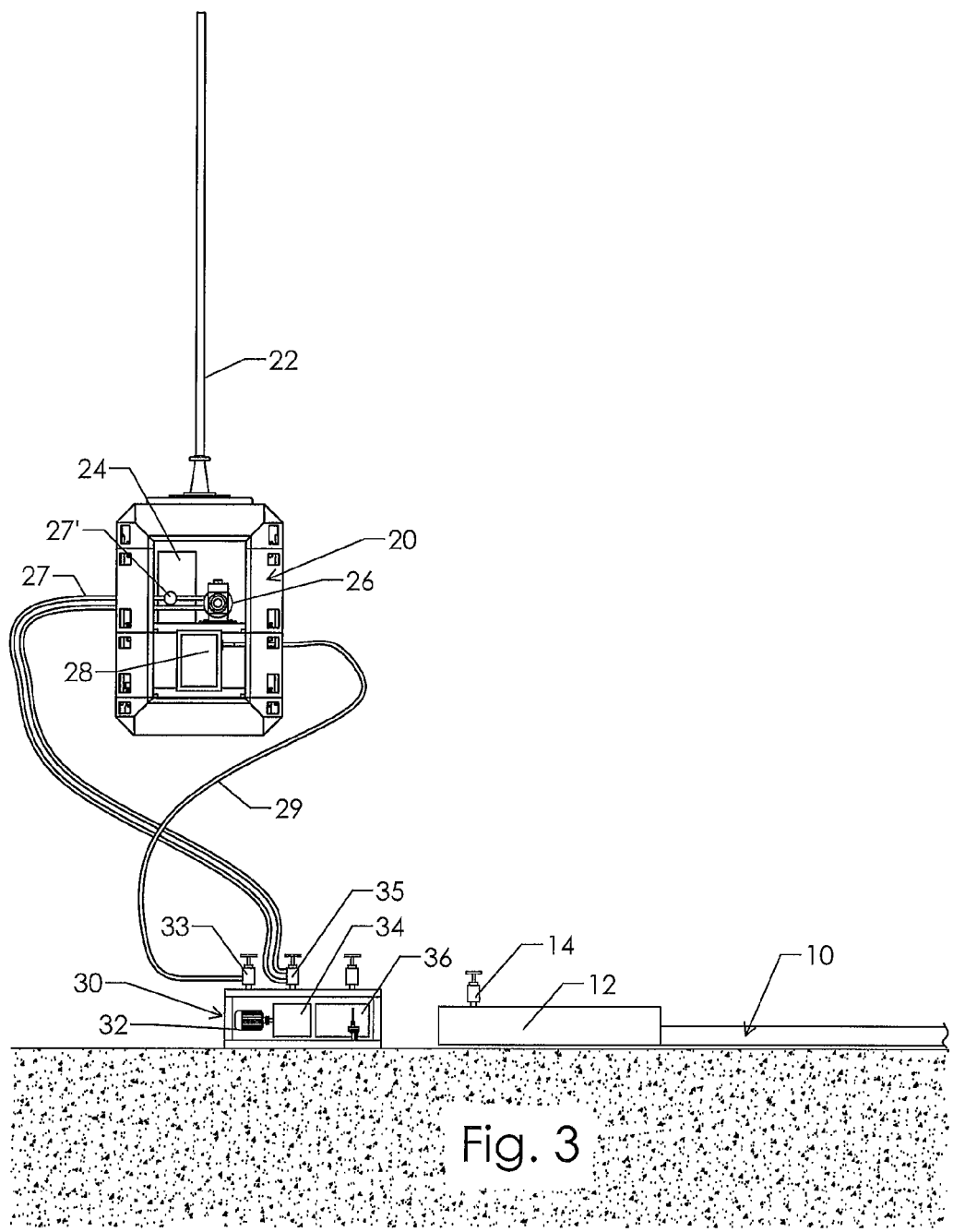
FIG. 3 is a schematic view of a pipeline that is to be commissioned that has a skid located subsea near the pipeline and the UPP providing the power to the motor(s) or pump(s) in the skid.

Referring to FIG. 3, a UPP 20 is lowered by an umbilical 22 above the skid 30 and in the vicinity of PLET 12 having a stab 14. In this embodiment, both the electric line 29 and the hydraulic circulation lines 27 are attached through stabs 33 and 35 respectively to power any and all equipment on skid 30.

Figure 4:
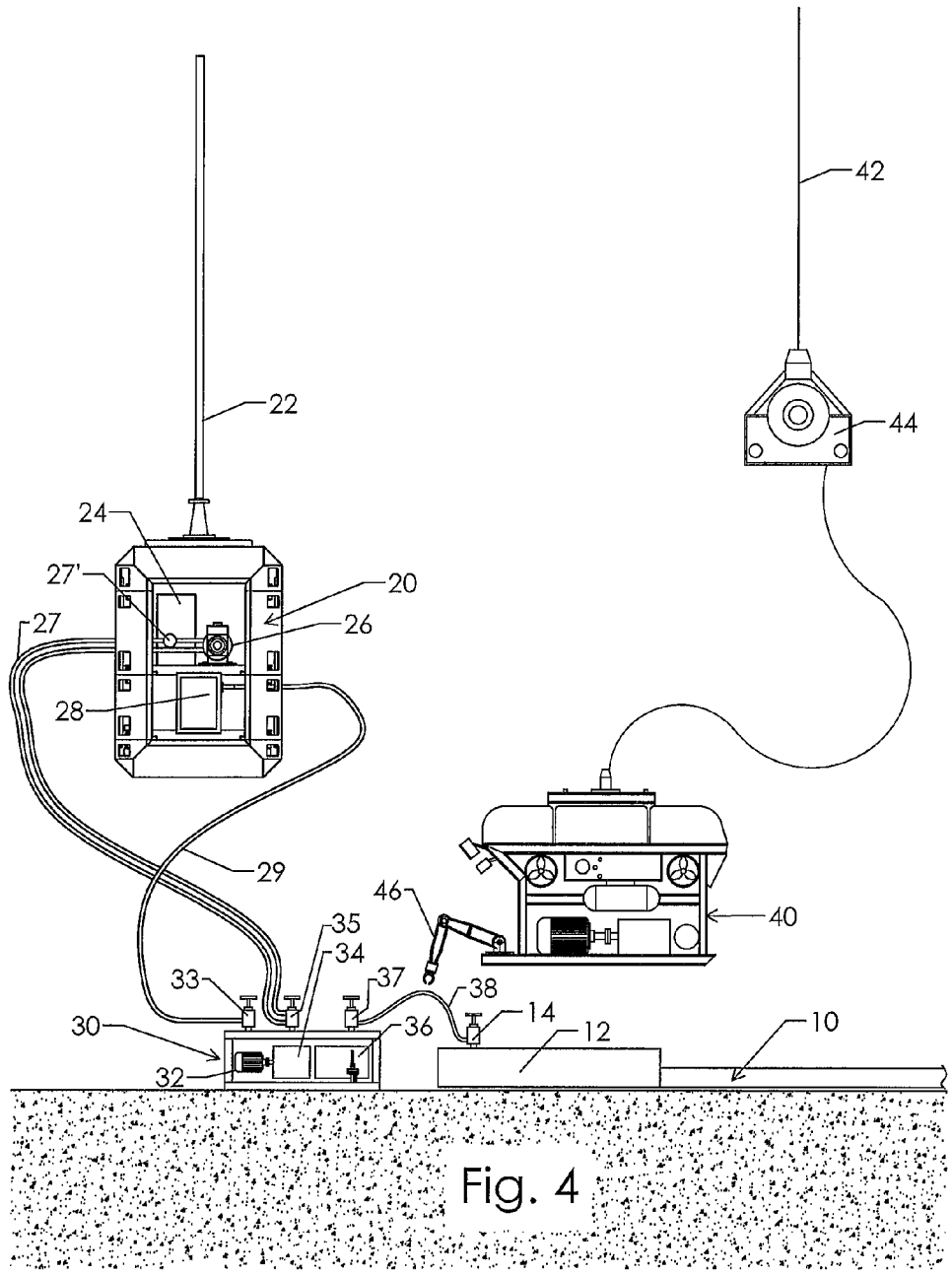
FIG. 4 is a schematic view of a pipeline that is to be commissioned that has a skid located subsea near the pipeline and the UPP providing the power to the motor(s) or pump(s) in the skid and a water line from the skid to the pipeline being connected to the pipeline by a Remote Operated Vehicle (ROV) to carry out a desired pre-commissioning method on the deep water pipeline.

Referring now to FIG. 4, a ROV 40 has its own umbilical 42 which is shown connected to a tether management system (TMS) 44. The ROV's manipulator 46 is used to connect the lines 27 and 29 to the skid 30 by placing in stabs 33 and 35 respectively. Also, the manipulator 46 connects the pump or pumps 36 of the skid 30 through a stab 37 and a line 38 to the stab 14 on the PLET 12 to access the water into pipeline 10.

Figure 5:
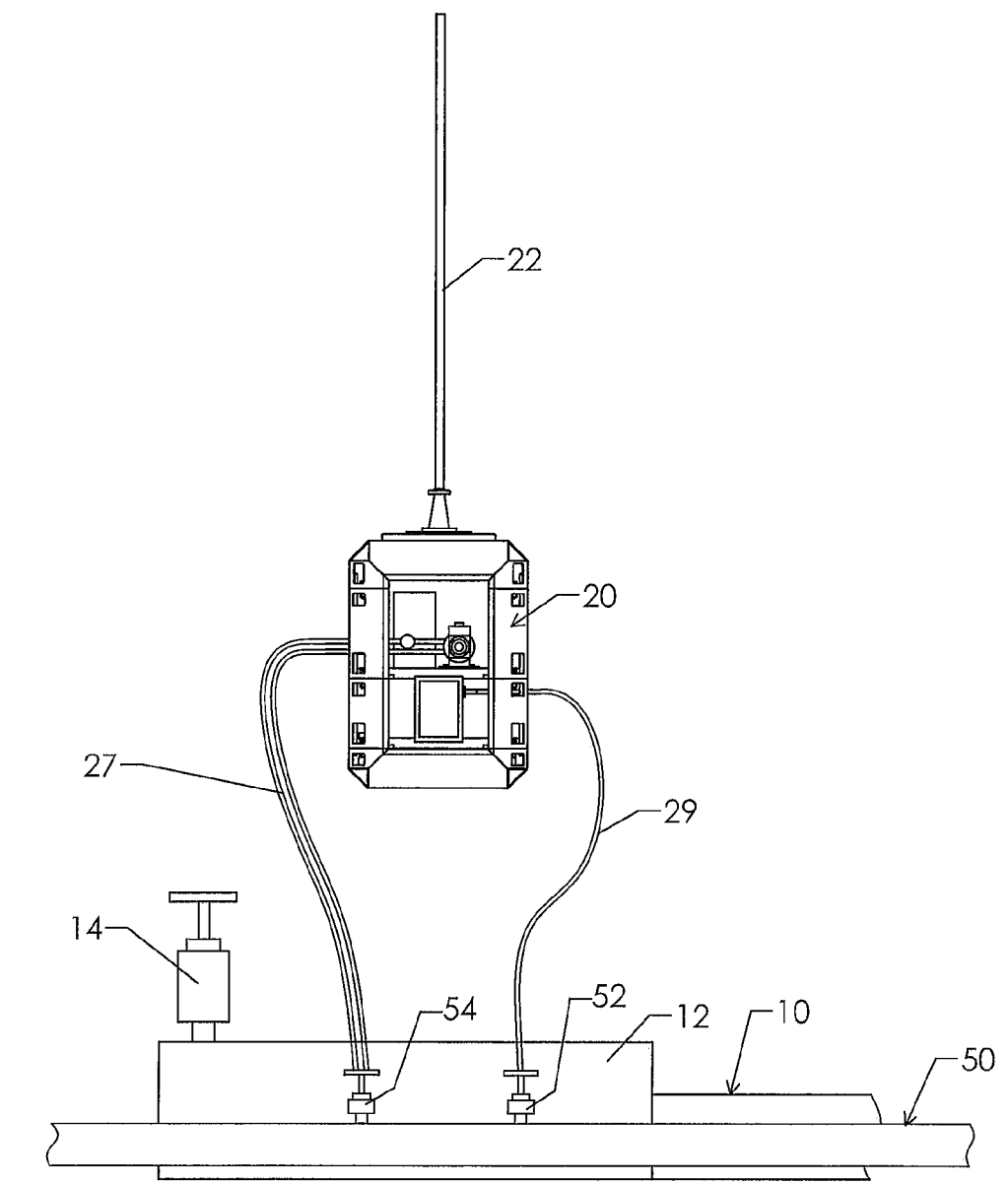
FIG. 5 is a schematic view of a pipeline ending at a pipeline end terminations (PLET) with a control umbilical running along side of the pipeline.

The UPP 20 of the present invention may be used as a testing system for control umbilicals 50 as illustrated in FIG. 5. A control umbilical 50 connects topside equipment to subsea equipment. The number and type of umbilicals vary according to field requirements and the umbilicals may carry different chemical injection lines, hydraulic supply lines and electrical cables and or fiber optic lines. Each umbilical 50 is a unique structure even though there are miles and miles of control umbilicals in place subsea. The UPP 20 is suited to test an umbilical 50 that has electrical cables imbedded in the structure by supplying an independent current to an electrical cable to determine the viability of that cable. Likewise, a hydraulic supply line may be accessed to make certain the pressure is correct or to change/clean the hydraulic fluid. The stab 52 represents an electrical cable being tested whereas stab 54 is to access a hydraulic line.

Figure 6:
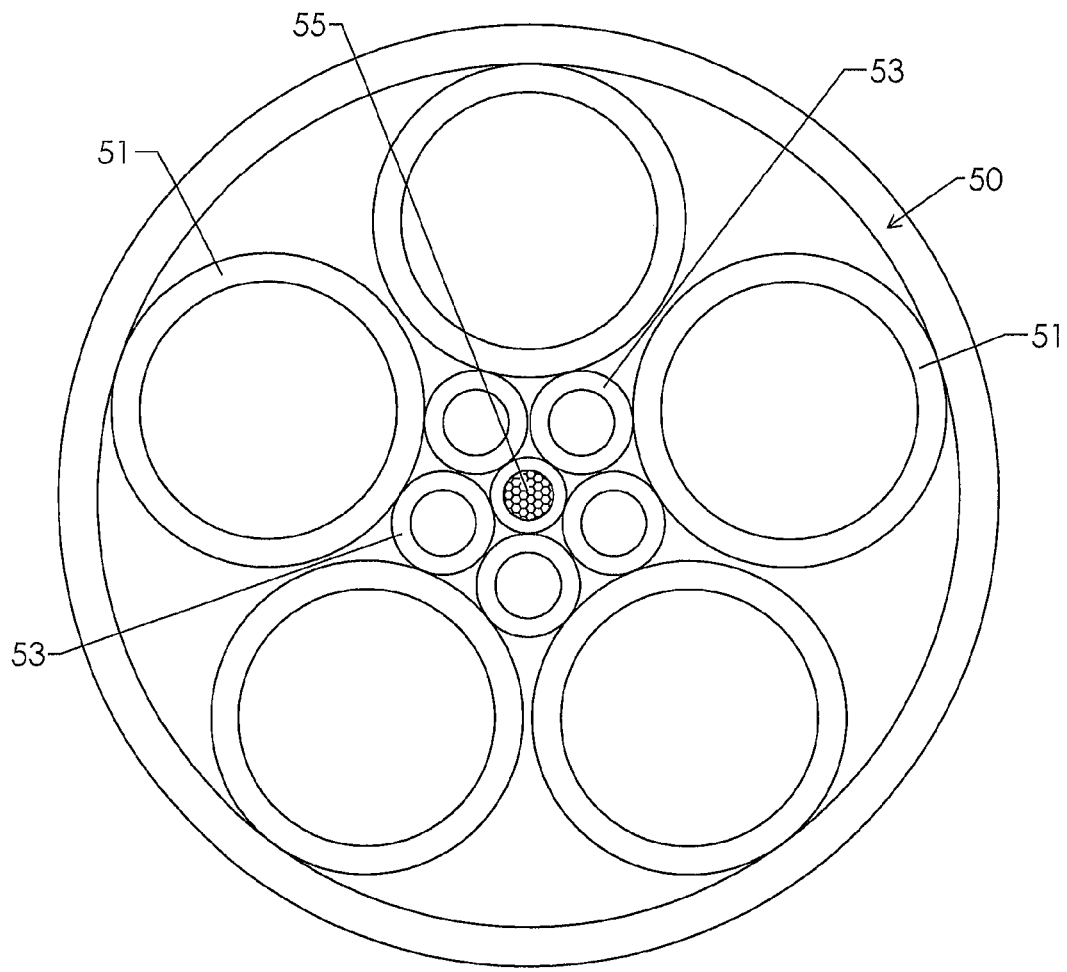
FIG. 6 is a cross-sectional view of a control umbilical.

Referring now to FIG. 6, this cross-section is only a representation of a control umbilical 50 wherein the conduits 51 may each be different but packed with electric cables, conduits 53 represent lines carrying hydraulic fluid whereas the other conduits of the same size may be carrying other fluids. The center conduit 55 represents a bundle of fiber optic fibers.

The invention claimed is:

1. A power system for equipment associated with deep water pipelines comprising:
    a non-buoyant platform suspended from a first umbilical and including an electrical junction box;
    a skid disposed proximal a subsea pipeline;
    one or more pumps mounted to the skid powered by an electric motor coupled to the electrical junction box, at least one of said pumps configured to perform a pre-commissioning method selected from filling, chemical treating, pigging, hydrostatic testing and dewatering on the pipeline; and a remotely operated vehicle independent of the platform and attached to a second umbilical.

2. The power system of claim 1, wherein the first umbilical is suspended from a vessel and connects to an electric motor for powering the one or more pumps.

3. The power system of claim 1, further comprising a third umbilical attached to the platform and skid, wherein the third umbilical is configured to power at least one electric motor mounted to the skid.

4. The power system of claim 3, wherein the remotely operated vehicle is configured to attach the third umbilical to the platform and is configured to attach the third umbilical to the skid.

5. The power system of claim 1 further comprising third and fourth umbilicals with the third umbilical attached to the platform and the skid, and the fourth umbilical attached to the pump and the skid, wherein the third and fourth umbilicals are configured to create a conduit for the recirculation of fluid between the platform and the skid.

6. The power system of claim 5, wherein the remotely operated vehicle is configured to attach the third umbilical to the platform and to the skid, and is configured to attach the fourth umbilical to the platform and to the skid.

7. The power system of claim 1, further comprising:
a control umbilical, wherein at least a portion of the control umbilical is disposed near the sea floor,
a third umbilical connecting the platform to the control umbilical, wherein the third umbilical is configured to provide a conduit for an electrical current between the platform and the control umbilical; and
a fourth and a fifth umbilical, wherein the fourth umbilical is attached to the platform and the control umbilical, and the fifth umbilical is attached to the pump and the control umbilical, wherein the fourth and the fifth umbilicals are configured to create a conduit for the recirculation of fluid between the platform and the control umbilical.

8. The power system of 7, wherein the remotely operated vehicle is configured to attach the third umbilical to the platform and is configured to attach the third umbilical to the control umbilical.

9. The power system of claim 7, wherein the remotely operated vehicle is configured to attach the fourth umbilical to the platform and to the control umbilical, and is configured to attach the fifth umbilical to the platform and to the control umbilical.

10. The power system of claim 1, wherein the first umbilical has data transmission capabilities.

11. The power system of claim 10, wherein a pressure data logger configured to measure the pressure in the pipeline and a temperature data logger configured to measure the temperature in the pipeline are connected to the first umbilical.

12. The power system of claim 11, wherein the data logger is configured to transmit information along the first umbilical to a vessel.

13. A power system for equipment associated with deep water pipelines comprising:
a non-buoyant platform suspended from a first umbilical and including an electric motor;
a skid disposed proximal a subsea pipeline;
one or more pumps amounted to the skid powered by an electric motor, at least one of the pumps configured to perform a pre-commissioning method selected from filling, chemical treating, pigging, hydrostatic testing and dewatering on the pipeline; and
a remotely operated vehicle independent of the platform and attached to a second umbilical.

14. The power system of claim 13, further comprising a third umbilical attached to the platform and skid, wherein the third umbilical is configured to power at least one electric motor mounted to the skid.

15. A power system for equipment associated with deep water pipelines comprising:
a non-buoyant platform suspended from a first umbilical and including an electric motor that is configured to drives a hydraulic pump;
a skid disposed proximal a subsea pipeline;
one or more pumps mounted to the skid subsea powered by hydraulic fluid, at least one pump configured to perform a pre-commissioning method selected from filling, chemical treating, pigging, hydrostatic testing and dewatering on the pipeline; and
a remotely operated vehicle independent of the platform and attached to a second umbilical.

16. The power system of claim 15, wherein the hydraulic pump is a pump for hydrostatically testing the pipeline.

17. A system according to claim 15 wherein said pump is a pump for filling said pipeline.

18. The power system of claim 15 further comprising third and fourth umbilicals with the third umbilical attached to the platform and the skid, and the fourth umbilical attached to the pump and the skid, wherein the third and fourth umbilicals are configured to create a conduit for the recirculation of fluid between the platform and the skid.

* * * * *